United States Patent [19]

Kroon et al.

[11] Patent Number: 4,674,806

[45] Date of Patent: Jun. 23, 1987

[54] MOVABLE STORAGE UNIT

[75] Inventors: Robert J. Kroon, Muscatine; Clayton C. Schmidt, Wilton, both of Iowa

[73] Assignee: The HON Company, Muscatine, Iowa

[21] Appl. No.: 705,074

[22] Filed: Feb. 25, 1985

[51] Int. Cl.[4] ............................................ B60B 33/08
[52] U.S. Cl. .................................. 312/250; 16/35 R; 188/1.12; 280/79.1 R
[58] Field of Search .................. 280/79.1 R; 16/35 R; 248/129; 188/1.12; 312/201, 250, 253

[56] References Cited

U.S. PATENT DOCUMENTS

| 3,772,733 | 11/1973 | Stosberg et al. | 188/1.12 |
| 4,290,660 | 9/1981 | Brezosky | 312/253 |
| 4,333,207 | 6/1982 | Atwood | 188/1.12 |
| 4,349,973 | 9/1982 | Fontana | 16/35 R |

FOREIGN PATENT DOCUMENTS 1505319  8/1967  France ................ 16/35 R

OTHER PUBLICATIONS

Amera International, Inc. product brochure no date.
HON Company (1800 Series) product brochure no date.
Eagle Computer Furniture Systems product brochure not date.
Atlantic product brochure no date.
All-Steel, Inc. product brochure no date.
Desk Makers, Inc. product brochure no date.
Marvel Metal Products Co., Inc. product brochure no date.
Hunt-Lightning, Inc. product brochure no date.
Artopex Inc. product brochure no date.
Amstore Systems, Inc. product brochure no date.
Laminates Unlimited, Inc. product brochure no date.
Borroughs Div., Lear Siegler, Inc. product brochure no date.
California Computer Furniture, Inc. product brochure no date.
Harter, Inc. product brochure no date.
Cramer, Inc. product brochure no date.
Computer Cabinet Corp no date.
Cole Business Furniture, Div. of Litton Ind., product brochure no date.
Shaw-Walker Co. product brochure no date.
Haskell of Pittsburgh, Inc. product brochure no date.
Atelier International, Ltd. product brochure no date.

Primary Examiner—Joseph Falk
Attorney, Agent, or Firm—Neuman, Williams, Anderson & Olson

[57] ABSTRACT

A movable storage unit is disclosed which comprises a storage unit housing with front casters and rear casters attached to the bottom of the housing by means of swivel attachments. Each front caster includes a locking brake with an actuation lever which extends forward through the lower portion of a skirt attached to the lower front of the housing. The skirt effectively screens the casters from view and holds each front caster in a position fixed toward the front of the unit relative to the caster's swivel axis. The skirt is recessed at the points through which the actuation levers extend, thereby improving the accessibility of the actuation levers and providing space to recess the actuation levers behind the front plane of the storage unit housing.

6 Claims, 5 Drawing Figures

MOVABLE STORAGE UNIT

BACKGROUND OF THE INVENTION

This invention relates to a movable storage unit mounted on casters, and more particularly an arrangement for effecting position control of the front casters and actuation of the locking brakes thereon.

Movable storage units as related to this invention are normally equipped with drawers for storing objects. Such units are primarily used as a furniture component in an office space, e.g., as mobile desk pedestal modules. Thus, the movable storage unit can be placed under the top of a larger unit in the office such as a work table, desk or credenza. In such a position, the storage units can be utilized in the same manner as would a set of drawers or other storage components in a pedestal permanently attached to the large unit. The storage units can also be used standing alone as an auxiliary piece in a work area.

The use of storage units mounted on casters is desirable for flexibility of office space and economy. Because the storage units are mounted on casters, each unit may quickly and easily be moved throughout an office space at the user's convenience. This flexibility is desired to permit a person to easily adapt a work area to the variety of layout arrangements which are necessitated by the various functions for which the area is used. Such flexibility is also desired for persons who regularly perform duties in more than one work area in an office. Such person's work materials can be easily transported for immediate use from one work area to another. The movable storage units also allow a person to make more economical long-term changes in the office layout. For example, as the needs of the office change, a desk without drawers can be easily converted to or from a desk with drawers by the addition or removal of the movable storage units.

For the purpose of being able to secure the position of the movable storage unit, it is preferred that the casters on the unit have a lock braking device. Because the storage unit is frequently moved to a position where the rear casters abut a wall or are otherwise inaccessible, such braking devices typically are placed in the front casters. Previous mobile storage units have fixed the position of the front casters by using non-swiveling type casters set in their forward position with brake levers extending to the front. It is preferred to use swivel mounted casters but to have these front casters fixed in their forward position relative to their swivel axes to minimize the tendency of the storage unit to tip forward when loaded drawers are opened and to insure ready access to the brake levers on the casters, e.g., to permit the user to conveniently actuate the braking mechanism with his toe. However, it is also desirable to screen or shield the casters and the associated space beneath the unit, and to avoid inadvertent contact with the brake levers by other furniture or people's feet.

OBJECTS OF THE INVENTION

It is a general object of this invention to provide an improved movable storage unit, and particularly to provide a caster and skirt arrangement which will meet the aforenoted problems and goals.

It is a more specific object of this invention to provide a stable movable storage unit without the necessity of using non-swivel type casters in the front of said unit.

It is a further object of this invention to improve the esthetic nature of the movable storage unit by means of a skirt which diminishes the exposure of the casters but does not hinder access to the caster brake levers.

It is still a further object of this invention to provide a movable storage unit where the brake levers of said unit are recessed from the plane of the storage unit, and yet where the user of said unit can easily guide his toe to actuate said brakes.

These and yet additional objects and features of this invention will become apparent from the following discussion of a preferred embodiment, and from the attached drawings and appended claims.

SUMMARY OF THE INVENTION

In accordance with one embodiment, front casters and rear casters are attached beneath a storage unit housing for means of movably supporting said housing. The front and rear casters have swivel attachment to the said housing. Each of the front casters has a locking brake with an actuation lever disposed generally parallel to the plane of the respective casters. Said front casters and braking levers are positioned towards the front of the storage housing unit relative to the swivel axes of the front casters. A skirt with two apertures on its lower part extends across the lower front of the storage unit housing and in front of the front casters. The brake levers of the front casters extend through the apertures of the skirt, and thereby hold the front casters in their forward position by the engagement of the respective actuation lever of each caster with the skirt. The actuation levers of the front casters are recessed from the front plane of the storage unit housing. The skirt defines a front-opening recess around each actuation lever to permit the actuation levers to be recessed from the front plane and to guide the toe of the user of the storage unit when setting and releasing the caster brake by the actuation levers.

BRIEF DESCRIPTION OF THE DRAWING

For a more complete understanding of the invention reference should now be made to the embodiments illustrated in greater detail in the accompanying drawings and described below by way of example of the invention. In the drawings.

It should be understood that the drawings are not necessarily to scale and that an embodiment is sometimes illustrated in part by phantom lines and fragmentary views. In certain instances, details of the actual structure which are not necessary for the understanding of the present invention may have been omitted. It should be understood, of course, that the invention is not necessarily limited to the particular embodiments illustrated herein.

DETAILED DESCRIPTION OF A PREFERRED EMBODIMENT

Figure 1:
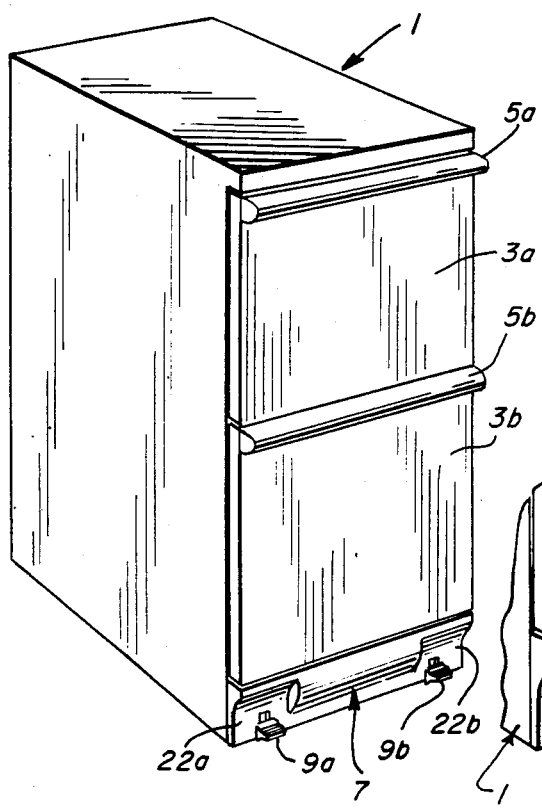
FIG. 1 is a perspective view of a movable storage unit employing teachings of this invention.
Figure 4:
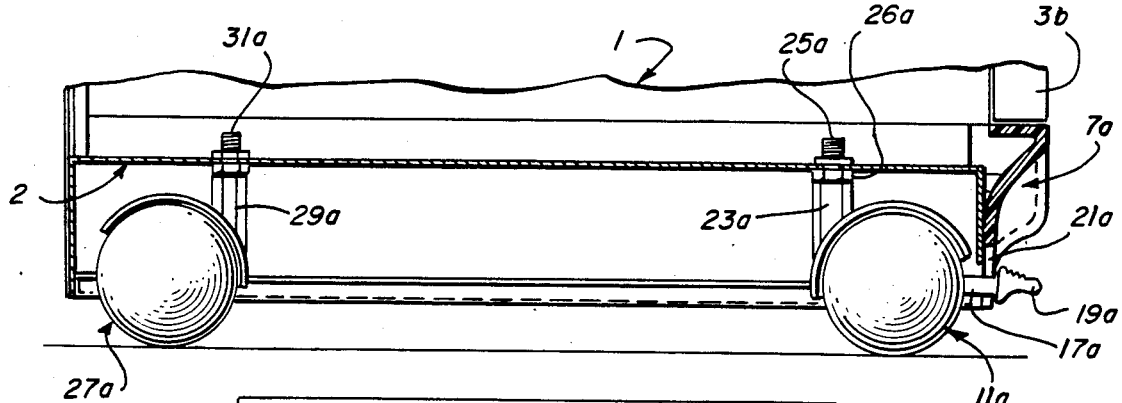
FIG. 4 is an enlarged, partial sectional view taken along the line 4—4 in FIG. 3 showing the caster arrangement of the unit shown in FIG. 1.

The device shown in FIG. 1 is a movable storage unit which serves as a mobile pedestal module, e.g., for a desk ensemble. That unit includes a housing 1 which is mounted on four casters. Housing 1 includes a frame 2 and drawers 3a and 3b extendable on the front side of the housing. These drawers may be withdrawn from said storage unit housing through the use of handles or lips 5a and 5b protruding from the top of the drawer front covers. It is to be noted that the size and placement of drawers is not a significant feature of this invention. The storage unit housing may utilize any means of storing objects, including cabinet space and/or drawers of varying sizes. A skirt 7 extends across the lower part of the front of said housing. As shown in FIGS. 1 and 4, skirt 7 and the side and rear walls of storage housing unit 1 extend downward over a major portion of the vertical height of the casters. They effectively screen the casters from the view of a person looking at said unit from a standing or sitting position.

Figure 2:
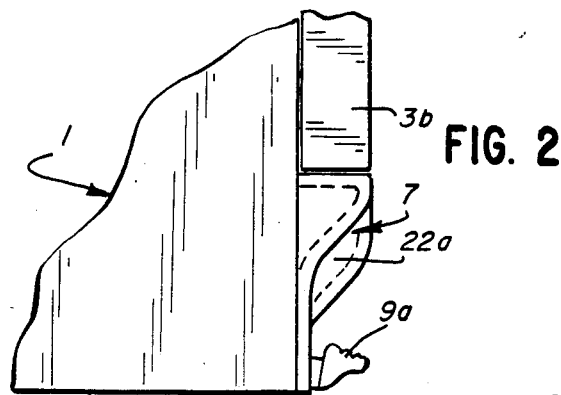
FIG. 2 is a partial, enlarged view of the lower front side of the unit shown in FIG. 1.
Figure 5:
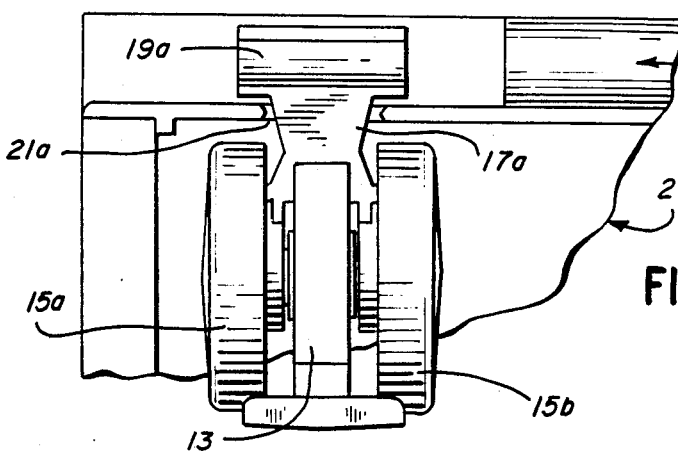
FIG. 5 is an enlarged, partial bottom view of the unit in FIG. 1 showing one front caster with its brake lever extending through the skirt.

As seen in FIGS. 2 and 5, one front caster 11a is located at a forward corner beneath storage unit housing 1, adjacent the front and adjacent the respective side. An identical front caster (not shown) is positioned correspondingly at the opposite front corner of said housing, directly behind the actuation lever 9b seen in FIGS. 1 and 3. Referring to FIG. 5, each front caster is comprised of a support hub or base 13 and dual wheels 15a and 15b which are rotatably mounted on the base. Wheels 15a and 15b rotate independently of one another, thereby increasing the ability of the storage unit to be maneuvered when being moved. An actuation lever 9a extends from base 13 toward the front of said storage unit. Actuation lever 9a is the means by which the user sets and releases a lock brake within front caster 11a. The caster and brake are of a known design, e.g., as marketed under the name Plastiglide, except for the extension of the actuation lever. The user sets the lock brake by depressing actuation lever 9a, typically with his toes. Similarly, the user releases said lock brake by pushing up on actuation lever 9a, typically with his toes. Actuation lever 9a consists of stem 17a which extends from the locking mechanism in base 13 and a pedal portion 19a. Pedal 19a is wider than the remainder of actuation lever 9a to facilitate actuation of said lock brake by the user.

Figure 3:
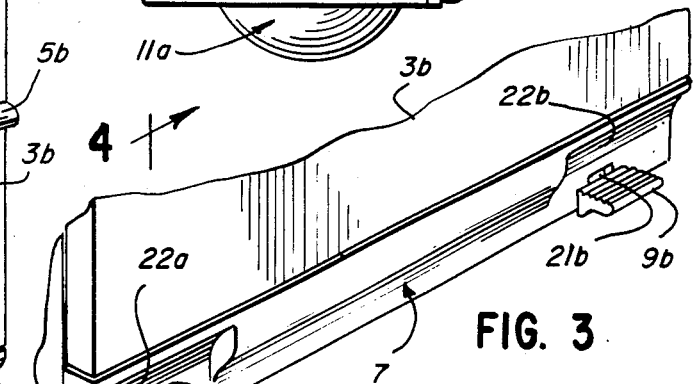
FIG. 3 is a partial, enlarged perspective view of the unit in FIG. 1 illustrating the skirt extending across the lower front on the storage unit housing and the brake levers extending therethrough.

As shown in FIGS. 3 and 5, actuation levers 9a and 9b, and particularly the stems 17, are of sufficient length to extend through skirt 7, through apertures 21a and 21b. The sides of skirt 7 defining apertures 21a and 21b prevent the swivel-type front casters from swivelling and thus fix such front casters in a forward position relative to their swivel axes 23a. Such forward positioning of the casters minimizes the tendency of the unit to tip forward when loaded drawers 3a and 3b are opened. It also prevents the front casters from turning inward, which would reduce the lateral stability of the storage unit.

Skirt 7 defines front-opening recesses 22a and 22b around the pedal portions of the actuation levers 9a and 9b. It will be seen from FIGS. 2 and 5 that the recesses in skirt 7 extend inward from the front plane of the unit 1 and provide space for actuation levers 9a and 9b to be recessed behind that plane while remaining readily accessible to the user. Such recessed actuation levers minimize the chances of people's feet or furniture inadvertantly contacting the levers. The provision of a separate recess for each actuation lever facilitates guiding the user's toe to the pedal portions of the actuation levers when actuating the lock brakes. A variety of differently configured skirts and/or recesses may be provided for this purpose.

Turning to FIG. 4, front caster 11a includes a swivel-mounting stem 23a which extends upwardly from base 13. A swivel pin 25a is journalled in stem 23a and is suitably attached to the frame 2 of the storage unit housing 1, e.g., by means of a pair of nuts 26a. In order to maximize the lateral stability of said unit, the front casters are positioned close to the side walls of storage unit housing 1 as shown in FIG. 5. A rear caster 27a is mounted on storage unit housing 1 by a swivel stem 29a and swivel pin 31a which is attached to frame 2 directly behind caster 11a, near the wall. The structure of rear caster 27a is identical to front caster 11a except for the absence of the lock brake mechanism of the front caster 11a. Another rear caster (not shown) is correspondingly located on the opposite side of the rear section of the storage unit. Each of the rear casters is free to swivel about the respective stem axis and is spaced a sufficient distance from the respective side and rear walls of the storage unit housing to permit this swivelling action when maneuvering the storage unit.

Thus it will be seen than an improved movable storage unit has been provided which meets the aforestated objects.

While a particular embodiment of the invention has been shown, it will be understood, of course, that the invention is not limited thereto since modifications may be made and other embodiments of the principles of this invention will occur to those skilled in the art to which this invention pertains, particularly upon considering the foregoing teachings. It is, therefore, contemplated by the appended claims to cover any such modification and other embodiments as incorporate those features which constitute the essential features of this invention within the true spirit and scope of the following claims.

What is claimed is:

1. A movable storage unit comprising a storage unit housing having a front surface, front casters and rear casters beneath and attached to said storage unit housing for movably supporting said housing, said front casters being inset beneath said housing from said front surface and including locking brakes with actuation levers disposed generally parallel to the planes of rotation of the respective casters and extending toward the front of said unit for setting and releasing said brakes, and a skirt across and attached to the lower front of said housing and extending in front of said front casters, each said actuation lever extending through an aperture in said skirt and being accessible in front thereof for actuation to set and release said brakes.

2. A movable storage unit as in claim 1 wherein said skirt includes a wall portion around each of said actuation levers and an intervening portion generally disposed between said wall portions, said wall portions being recessed relative to the intervening portion of said skirt whereby each of said recessed wall portions defines front opening recess about the respective lever.

3. A movable storage unit as in claim 2 wherein said actuation levers are disposed behind the plane of said front surface of said housing.

4. A movable storage unit comprising a storage unit housing having a front surface; front casters and rear casters beneath said storage unit housing for movably supporting said housing, each of said casters having swivel attachment to said storage unit housing, each of said front casters being inset beneath said housing from said front surface and positioned toward the front of said housing relative to its swivel axis, each of said front casters including a hub, a wheel mounted on said hub and having a plane of rotation, and a locking brake with an actuation lever fixed to the hub of said front caster in a plane generally parallel to said plane of rotation of the respective caster and extended toward the front of said unit for setting and releasing said brake; a skirt across and attached to the lower front of said housing and extending in front of said front casters; each said actuation lever extending through an opening in said skirt whereby lateral movement of said lever is limited by the engagement of the respective actuation lever with said skirt at the respective sides of the respective opening, thereby preventing swiveling movement of said front casters.

5. A movable storage unit as in claim 4 wherein said skirt includes a wall portion around each of said actuation levers and an intervening portion generally disposed between said wall portions, said wall portions being recessed relative to the intervening portion of said skirt whereby each of said recessed wall portions defines a front-opening recess about the respective lever.

6. A movable storage unit as in claim 5 wherein said actuation levers are disposed behind the plane of said front surface of said housing.

* * * * *